US008565386B2

(12) United States Patent
Michaelis (10) Patent No.: US 8,565,386 B2
(45) Date of Patent: Oct. 22, 2013

(54) AUTOMATIC CONFIGURATION OF SOFT PHONES THAT ARE USABLE IN CONJUNCTION WITH SPECIAL-PURPOSE ENDPOINTS

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 983 days.

(21) Appl. No.: 12/569,581

(22) Filed: Sep. 29, 2009

(65) Prior Publication Data
US 2011/0075821 A1 Mar. 31, 2011

(51) Int. Cl.
*H04M 11/00* (2006.01)

(52) U.S. Cl.
USPC ............................ 379/88.13; 379/52

(58) Field of Classification Search
USPC ................... 379/100.01–102.07, 52, 88.13
See application file for complete search history.

(56) References Cited

U.S. PATENT DOCUMENTS

| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,754,335 A * | 6/1988 | Izawa et al. ............ 358/440 |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |
| 5,210,789 A | 5/1993 | Jeffus et al. |
| 5,267,302 A * | 11/1993 | Kotani et al. ............ 379/100.15 |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,311,422 A | 5/1994 | Loftin et al. |
| 5,325,292 A | 6/1994 | Crockett |

(Continued)

FOREIGN PATENT DOCUMENTS

| CA | 2143198 | 1/1995 |
| CA | 2174762 | 6/1995 |

(Continued)

OTHER PUBLICATIONS

"3rd Generation Partnership Project; Technical Specification Group Services and System Aspects; IP Multimedia Subsystem (IMS) service continuity enhancements; Service, policy and interaction; Stage 2 (Release 9)," 3GPP Partnership Project, Standard TR 23.838 V1.1. 0, Apr. 2009, 54 pages.

(Continued)

*Primary Examiner* — Simon Sing
(74) *Attorney, Agent, or Firm* — Sheridan Ross P.C.

(57) ABSTRACT

The present disclosure is directed, in some embodiments, to automatic switching of a telephony module between different operational modes in response to the identification of different types of incoming contacts.

18 Claims, 3 Drawing Sheets

(56) References Cited

U.S. PATENT DOCUMENTS

| | | |
|---|---|---|
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,513,212 A * | 4/1996 | Bremer .................. 375/222 |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,673,205 A | 9/1997 | Brunson |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,781,614 A | 7/1998 | Brunson |
| 5,784,452 A | 7/1998 | Carney |
| 5,787,410 A | 7/1998 | McMahon |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | Mcneil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | Mcnerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | Mccalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,298,062 B1 | 10/2001 | Gardell et al. |
| 6,307,931 B1 | 10/2001 | Vaudreuil |
| 6,324,282 B1 | 11/2001 | Mcillwaine et al. |
| 6,332,081 B1 | 12/2001 | Do |
| 6,339,754 B1 | 1/2002 | Flanagan et al. |
| 6,353,810 B1 | 3/2002 | Petrushin |
| 6,356,632 B1 | 3/2002 | Foster et al. |
| 6,360,222 B1 | 3/2002 | Quinn |
| 6,366,666 B2 | 4/2002 | Bengtson et al. |

(56) References Cited

U.S. PATENT DOCUMENTS

| | | |
|---|---|---|
| 6,366,668 B1 | 4/2002 | Borst et al. |
| 6,381,253 B1 * | 4/2002 | Benayoun et al. ............ 370/522 |
| 6,389,028 B1 | 5/2002 | Bondarenko et al. |
| 6,389,132 B1 * | 5/2002 | Price ...................... 379/265.01 |
| 6,389,400 B1 | 5/2002 | Bushey et al. |
| 6,408,066 B1 | 6/2002 | Andruska et al. |
| 6,408,277 B1 | 6/2002 | Nelken |
| 6,411,682 B1 | 6/2002 | Fuller et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,446,092 B1 | 9/2002 | Sutter |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | Mcfarlane et al. |
| 6,463,148 B1 | 10/2002 | Brady |
| 6,463,346 B1 | 10/2002 | Flockhart et al. |
| 6,463,415 B2 | 10/2002 | St. John |
| 6,463,471 B1 | 10/2002 | Dreke et al. |
| 6,480,826 B2 | 11/2002 | Pertrushin |
| 6,490,350 B2 | 12/2002 | Mcduff et al. |
| 6,493,558 B1 | 12/2002 | Bernhart et al. |
| 6,535,600 B1 | 3/2003 | Fisher et al. |
| 6,535,601 B1 | 3/2003 | Flockhart et al. |
| 6,553,114 B1 | 4/2003 | Fisher et al. |
| 6,556,974 B1 | 4/2003 | D'Alessandro |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,563,921 B1 | 5/2003 | Williams et al. |
| 6,571,285 B1 | 5/2003 | Groath et al. |
| 6,574,599 B1 | 6/2003 | Lim et al. |
| 6,574,605 B1 | 6/2003 | Sanders et al. |
| 6,597,685 B2 | 7/2003 | Miloslavsky et al. |
| 6,603,854 B1 | 8/2003 | Judkins et al. |
| 6,604,084 B1 | 8/2003 | Powers et al. |
| 6,614,903 B1 | 9/2003 | Flockhart et al. |
| 6,650,748 B1 | 11/2003 | Edwards et al. |
| 6,662,188 B1 | 12/2003 | Rasmussen et al. |
| 6,668,167 B2 | 12/2003 | Mcdowell et al. |
| 6,675,168 B2 | 1/2004 | Shapiro et al. |
| 6,684,192 B2 | 1/2004 | Honarvar et al. |
| 6,697,457 B2 | 2/2004 | Petrushin |
| 6,700,967 B2 | 3/2004 | Kleinoder et al. |
| 6,704,409 B1 | 3/2004 | Dilip et al. |
| 6,707,903 B2 | 3/2004 | Burok et al. |
| 6,711,253 B1 | 3/2004 | Prabhaker |
| 6,724,885 B1 | 4/2004 | Deutsch et al. |
| 6,735,299 B2 | 5/2004 | Krimstock et al. |
| 6,735,593 B1 | 5/2004 | Williams |
| 6,738,462 B1 | 5/2004 | Brunson |
| 6,744,877 B1 | 6/2004 | Edwards |
| 6,754,333 B1 | 6/2004 | Flockhart et al. |
| 6,757,362 B1 | 6/2004 | Cooper et al. |
| 6,766,013 B2 | 7/2004 | Flockhart et al. |
| 6,766,014 B2 | 7/2004 | Flockhart et al. |
| 6,766,326 B1 | 7/2004 | Cena |
| 6,775,377 B2 | 8/2004 | Mcillwaine et al. |
| 6,785,666 B1 | 8/2004 | Nareddy et al. |
| 6,798,767 B1 * | 9/2004 | Alexander et al. ............ 370/352 |
| 6,822,945 B2 | 11/2004 | Petrovykh |
| 6,829,348 B1 | 12/2004 | Schroeder et al. |
| 6,839,735 B2 | 1/2005 | Wong et al. |
| 6,842,503 B1 | 1/2005 | Wildfeuer |
| 6,847,973 B2 | 1/2005 | Griffin et al. |
| 6,898,190 B2 | 5/2005 | Shtivelman et al. |
| 6,914,964 B1 | 7/2005 | Levine |
| 6,915,305 B2 | 7/2005 | Subramanian et al. |
| 6,947,543 B2 | 9/2005 | Alvarado et al. |
| 6,947,988 B1 | 9/2005 | Saleh |
| 6,963,826 B2 | 11/2005 | Hanaman et al. |
| 6,968,052 B2 | 11/2005 | Wullert, II |
| 6,981,061 B1 | 12/2005 | Sakakura |
| 6,985,901 B1 | 1/2006 | Sachse et al. |
| 6,988,126 B2 | 1/2006 | Wilcock et al. |
| 7,010,542 B2 | 3/2006 | Trappen et al. |
| 7,020,254 B2 | 3/2006 | Phillips |
| 7,035,808 B1 | 4/2006 | Ford |
| 7,035,927 B2 | 4/2006 | Flockhart et al. |
| 7,039,176 B2 | 5/2006 | Borodow et al. |
| 7,054,434 B2 | 5/2006 | Rodenbusch et al. |
| 7,062,031 B2 | 6/2006 | Becerra et al. |
| 7,076,051 B2 | 7/2006 | Brown et al. |
| 7,100,200 B2 | 8/2006 | Pope et al. |
| 7,103,562 B2 | 9/2006 | Kosiba et al. |
| 7,110,525 B1 | 9/2006 | Heller et al. |
| 7,117,193 B1 | 10/2006 | Basko et al. |
| 7,127,058 B2 | 10/2006 | O'Connor et al. |
| 7,136,873 B2 | 11/2006 | Smith et al. |
| 7,149,733 B2 | 12/2006 | Lin et al. |
| 7,151,820 B2 | 12/2006 | Vejlgaard |
| 7,155,612 B2 | 12/2006 | Licis |
| 7,158,628 B2 | 1/2007 | McConnell et al. |
| 7,162,469 B2 | 1/2007 | Anonsen et al. |
| 7,165,075 B2 | 1/2007 | Harter et al. |
| 7,170,976 B1 | 1/2007 | Keagy |
| 7,170,992 B2 | 1/2007 | Knott et al. |
| 7,174,004 B1 | 2/2007 | Michaelis |
| 7,177,401 B2 | 2/2007 | Mundra et al. |
| 7,200,219 B1 | 4/2007 | Edwards et al. |
| 7,203,655 B2 | 4/2007 | Herbert et al. |
| 7,212,622 B2 | 5/2007 | Delaney et |
| 7,212,625 B1 | 5/2007 | Mckenna et al. |
| 7,215,744 B2 | 5/2007 | Scherer |
| 7,218,626 B2 * | 5/2007 | Shaheen et al. ............... 370/338 |
| 7,222,075 B2 | 5/2007 | Petrushin |
| 7,246,371 B2 | 7/2007 | Diacakis et al. |
| 7,248,565 B1 | 7/2007 | Fourie |
| 7,257,513 B2 | 8/2007 | Lilly |
| 7,257,597 B1 | 8/2007 | Pryce et al. |
| 7,266,508 B1 | 9/2007 | Owen et al. |
| 7,283,805 B2 | 10/2007 | Agrawal |
| 7,295,669 B1 | 11/2007 | Denton et al. |
| 7,299,259 B2 | 11/2007 | Petrovykh |
| 7,324,954 B2 | 1/2008 | Calderaro et al. |
| 7,336,779 B2 | 2/2008 | Boyer et al. |
| 7,340,408 B1 | 3/2008 | Drew et al. |
| 7,373,341 B2 | 5/2008 | Polo-Malouvier |
| 7,376,127 B2 | 5/2008 | Hepworth et al. |
| 7,386,100 B2 | 6/2008 | Michaelis |
| 7,392,402 B2 | 6/2008 | Suzuki |
| 7,409,423 B2 | 8/2008 | Horvitz et al. |
| 7,415,417 B2 | 8/2008 | Boyer et al. |
| 7,418,093 B2 | 8/2008 | Knott et al. |
| 7,468,983 B2 * | 12/2008 | Requena et al. ............... 370/401 |
| 7,499,844 B2 | 3/2009 | Whitman, Jr. |
| 7,500,241 B1 | 3/2009 | Flockhart et al. |
| 7,526,440 B2 | 4/2009 | Walker et al. |
| 7,532,628 B2 * | 5/2009 | Lepore et al. .................. 370/401 |
| 7,545,761 B1 | 6/2009 | Kalbag |
| 7,545,925 B2 | 6/2009 | Williams |
| 7,567,653 B1 | 7/2009 | Michaelis |
| 7,711,104 B1 | 5/2010 | Flockhart et al. |
| 7,734,032 B1 | 6/2010 | Kiefhaber |
| 7,779,042 B1 | 8/2010 | Bland et al. |
| 7,787,609 B1 | 8/2010 | Flockhart et al. |
| 7,809,125 B2 | 10/2010 | Brunson et al. |
| 7,822,587 B1 | 10/2010 | Krimstock et al. |
| 7,885,209 B1 | 2/2011 | Michaelis et al. |
| 7,936,867 B1 | 5/2011 | Hill et al. |
| 7,944,870 B2 | 5/2011 | Varland |
| 7,978,827 B1 | 7/2011 | Becker et al. |
| 8,059,656 B1 * | 11/2011 | Telikepalli et al. ......... 370/395.2 |
| 8,094,664 B2 * | 1/2012 | Kuure et al. ............... 370/395.2 |
| 2001/0011228 A1 | 8/2001 | Shenkman |
| 2001/0034628 A1 | 10/2001 | Eder |
| 2002/0019829 A1 | 2/2002 | Shapiro |
| 2002/0021307 A1 | 2/2002 | Glenn et al. |
| 2002/0035605 A1 | 3/2002 | Mcdowell et al. |
| 2002/0038422 A1 | 3/2002 | Suwamoto et al. |

(56) References Cited

U.S. PATENT DOCUMENTS

| | | |
|---|---|---|
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0123923 A1 | 9/2002 | Manganaris et al. |
| 2002/0147730 A1 | 10/2002 | Kohno |
| 2002/0194096 A1 | 12/2002 | Falcone et al. |
| 2003/0004704 A1 | 1/2003 | Baron |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0108186 A1 | 6/2003 | Brown et al. |
| 2003/0142200 A1 | 7/2003 | Canova |
| 2003/0144900 A1 | 7/2003 | Whitmer |
| 2003/0144959 A1 | 7/2003 | Makita |
| 2003/0231757 A1 | 12/2003 | Harkreader et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0052243 A1 | 3/2004 | Bostrom et al. |
| 2004/0054743 A1 | 3/2004 | Mcpartlan et al. |
| 2004/0057569 A1 | 3/2004 | Busey et al. |
| 2004/0095938 A1 | 5/2004 | Ryu |
| 2004/0102940 A1 | 5/2004 | Lendermann et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0193646 A1 | 9/2004 | Cuckson et al. |
| 2004/0196961 A1 | 10/2004 | Freundlich et al. |
| 2004/0202308 A1 | 10/2004 | Baggenstoss et al. |
| 2004/0202309 A1 | 10/2004 | Baggenstoss et al. |
| 2004/0203878 A1 | 10/2004 | Thomson |
| 2004/0210475 A1 | 10/2004 | Starnes et al. |
| 2004/0240659 A1 | 12/2004 | Gagle et al. |
| 2004/0249650 A1 | 12/2004 | Freedman et al. |
| 2004/0260706 A1 | 12/2004 | Anonsen et al. |
| 2005/0021529 A1 | 1/2005 | Hodson et al. |
| 2005/0044375 A1 | 2/2005 | Paatero et al. |
| 2005/0049911 A1 | 3/2005 | Engelking et al. |
| 2005/0065837 A1 | 3/2005 | Kosiba et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0091071 A1 | 4/2005 | Lee |
| 2005/0125432 A1 | 6/2005 | Lin et al. |
| 2005/0125458 A1 | 6/2005 | Sutherland et al. |
| 2005/0138064 A1 | 6/2005 | Trappen et al. |
| 2005/0154708 A1 | 7/2005 | Sun |
| 2005/0182784 A1 | 8/2005 | Trappen et al. |
| 2005/0228707 A1 | 10/2005 | Hendrickson |
| 2005/0261035 A1 | 11/2005 | Groskreutz et al. |
| 2005/0283393 A1 | 12/2005 | White et al. |
| 2005/0289446 A1 | 12/2005 | Moncsko et al. |
| 2006/0004686 A1 | 1/2006 | Molnar et al. |
| 2006/0007916 A1 | 1/2006 | Jones et al. |
| 2006/0015388 A1 | 1/2006 | Flockhart et al. |
| 2006/0026049 A1 | 2/2006 | Joseph et al. |
| 2006/0056598 A1 | 3/2006 | Brandt et al. |
| 2006/0058049 A1 | 3/2006 | McLaughlin et al. |
| 2006/0100973 A1 | 5/2006 | McMaster et al. |
| 2006/0135058 A1 | 6/2006 | Karabinis |
| 2006/0167667 A1 | 7/2006 | Maturana et al. |
| 2006/0178994 A1 | 8/2006 | Stolfo et al. |
| 2006/0187900 A1 | 8/2006 | Akbar |
| 2006/0242160 A1 | 10/2006 | Kanchwalla et al. |
| 2006/0256957 A1 | 11/2006 | Fain et al. |
| 2006/0271418 A1 | 11/2006 | Hackbarth et al. |
| 2006/0285648 A1 | 12/2006 | Wahl et al. |
| 2007/0038632 A1 | 2/2007 | Engstrom |
| 2007/0064912 A1 | 3/2007 | Kagan et al. |
| 2007/0083572 A1 | 4/2007 | Bland et al. |
| 2007/0112953 A1 | 5/2007 | Barnett |
| 2007/0127643 A1 | 6/2007 | Keagy |
| 2007/0156375 A1 | 7/2007 | Meier et al. |
| 2007/0192414 A1 | 8/2007 | Chen et al. |
| 2007/0201311 A1 | 8/2007 | Olson |
| 2007/0201674 A1 | 8/2007 | Annadata et al. |
| 2007/0230681 A1 | 10/2007 | Boyer et al. |
| 2008/0056165 A1 | 3/2008 | Petrovykh |
| 2009/0193050 A1 | 7/2009 | Olson |
| 2009/0228474 A1 | 9/2009 | Chiu et al. |
| 2009/0239519 A1 | 9/2009 | Fujino |
| 2011/0116505 A1 | 5/2011 | Hymus et al. |

FOREIGN PATENT DOCUMENTS

| | | |
|---|---|---|
| EP | 0501189 | 9/1992 |
| EP | 0576205 | 12/1993 |
| EP | 0740450 | 10/1996 |
| EP | 0770967 | 5/1997 |
| EP | 0772335 | 5/1997 |
| EP | 0829996 | 3/1998 |
| EP | 0855826 | 7/1998 |
| EP | 0863651 | 9/1998 |
| EP | 0866407 | 9/1998 |
| EP | 0899673 | 3/1999 |
| EP | 0998108 | 5/2000 |
| EP | 1035718 | 9/2000 |
| EP | 1091307 | 4/2001 |
| EP | 1150236 | 10/2001 |
| EP | 1761078 | 3/2007 |
| EP | 1924094 | 5/2008 |
| EP | 2071817 | 6/2009 |
| GB | 2273418 | 6/1994 |
| GB | 2290192 | 12/1995 |
| JP | 07-007573 | 1/1995 |
| JP | 2000-224333 | 8/2000 |
| JP | 2001-053843 | 2/2001 |
| JP | 2002-032977 | 1/2002 |
| JP | 2002-274054 | 9/2002 |
| JP | 2002-304313 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 00/26804 | 5/2000 |
| WO | WO 00/26816 | 5/2000 |
| WO | WO 01/19096 | 3/2001 |
| WO | WO 01/80094 | 10/2001 |
| WO | WO 02/099640 | 12/2002 |
| WO | WO 03/015425 | 2/2003 |
| WO | WO 03/032601 | 4/2003 |
| WO | WO 2007/062418 | 5/2007 |

OTHER PUBLICATIONS

Wilson Christopher Lamb: "DTMF to TTY gateway", Research Disclosure, Mason Publications, Hampshire, GB, vol. 462, No. 46, Oct. 1, 2002, ISSN: 0374-4353.
Extended European Search Report for European Patent Application No. 10181556.1, dated May 9, 2011.
Search Report for European Patent Application No. 06254426.7, dated Nov. 3, 2009, 7 pages.
Official Action for U.S. Appl. No. 12/620,428, mailed Feb. 15, 2012, 17 pages.
Hellstrom et al., RFC-4103 Protocol, entitled "RTP Payload for Text Conversation," Network Working Group, http://www.rfc-editor.org/rfc/rfc4103.txt, Jun. 2005, 18 pages.
Venkatesan et al., "A Customer Lifetime Value Framework for Customer Selection and Resource Allocation Strategy," Journal of Marketing, Oct. 2004, vol. 68, pp. 106-125.
U.S. Appl. No. 11/956,779, filed Dec. 14, 2007, Burritt et al.
Official Action for U.S. Appl. No. 12/620,428, mailed Jun. 28, 2012 16 pages.
US 6,537,685, Mar. 2003, Higuchi (withdrawn).
U.S. Appl. No. 10/815,566, filed Mar. 31, 2004, Kiefhaber.
U.S. Appl. No. 10/815,584, filed Mar. 31, 2004, Kiefhaber.

(56) References Cited

OTHER PUBLICATIONS

U.S. Appl. No. 10/861,193, filed Jun. 3, 2004, Flockhart et al.
U.S. Appl. No. 11/517,646, filed Sep. 7, 2004, Hackbarth et al.
U.S. Appl. No. 11/536,456, filed Sep. 28, 2006, Hackbarth et al.
U.S. Appl. No. 11/861,857, filed Sep. 26, 2007, Tendick et al.
U.S. Appl. No. 12/242,916, filed Oct. 1, 2006, Kiefhaber et al.
U.S. Appl. No. 12/789,038, filed May 27, 2010, Bland et al.
"Access for 9-1-1 and Telephone Emergency Services," Americans with Disabilities Act, U.S. Department of Justice, Civil Rights Division, Jul. 15, 1998, available at http://www.usdoj.gov/crt/ada/911ta.htm, 11 pages.
"Analysis and Reporting," Aspect Communications, May 19, 2005, http://aspect.com/products/analysis/index.cfm, 1 page.
"Applications, NPRI's Predictive Dialing Package," Computer Technology, Fall 1993, p. 86.
"Avaya and Blue Pumpkin—Providing Workforce Optimization Solutions," Avaya Inc., May 2004, 3 pages.
"Avaya and Texas Digital Systems—Providing Real-time Access to Call Statistics," Avaya Inc., May 2004, 3 pages.
"Avaya Basic Call Management System Reporting Desktop," Avaya Inc., Jan. 2002, 4 pages.
"Avaya Call Management System," Avaya Inc., Oct. 2003, 3 pages.
"Avaya IQ—Building Upon the Strengths of CMS," Avaya White Paper, Feb. 2007, 11 pages.
"Call Center Recording for Call Center Quality Assurance," Voice Print International, Inc., available at http://www.voiceprintonline.com/call-center-recording.asp?ad_src=google&srch_trm=call_center_monitoring, date unknown, printed May 10, 2007, 2 pages.
"Call Center Reports," Aspect Communications, May 19, 2005, http://aspect.com/products/analysis/ccreporting.cfm, 2 pages.
"Call Center Software You Can't Outgrow," Telemarketing®, Jul. 1993, p. 105.
"Centrex Internet Enabled Call Centers," Nortel, http://www.products.nortel.com/go/product_assoc.jsp?segId=0&parID=0&catID=-9191&rend_id . . . , copyright 1999-2005, printed May 19, 2005, 1 page.
"CS 345: Topics in Data Warehousing," Oct. 5, 2004, 36 pages.
"Dimensional database," Wikipedia, downloaded Aug. 30, 2007, 3 pages.
"Chapter 9: Domain Name Services," available at http://www.pism.com/chapt09/chapt09.html, downloaded Mar. 31, 2003, 21 pages.
"Driving Model Agent Behaviors With Avaya IQ," Avaya White Paper, Apr. 2007, 12 pages.
"eGain's Commerce 2000 Platform Sets New Standard for eCommerce Customer Communications," Business Wire, Nov. 15, 1999, 3 pages.
"Internet Protocol Addressing," available at http://samspade.org/d/ipdns.html, downloaded Mar. 31, 2003, 9 pages.
"Kana—Contact Center Support," available at http://www.kana.com/solutions.php?tid=46, copyright 2006, printed May 10, 2007, 3 pages.
"Learn the structure of an Access database," available at http://office.microsoft.com/en-us/access/HA012139541033.aspx, site updated Nov. 13, 2007, pp. 1-4.
"Monitoring: OneSight Call Statistics Monitors," available at http://www.empirix.com/default.asp?action=article&ID=301, copyright 2007, printed May 10, 2007, 2 pages.
"Multi-Dimensional Modeling with BW ASAP for BW Accelerator Business Information Warehouse," SAP AG and SAP America, copyright 2000, 71 pages.
"Oracle and Siebel," Oracle, available at http://www.oracle.com/siebel/index.html, printed May 10, 2007, 2 pages.
"Performance Optimization," Aspect Communications, May 19, 2005, http://aspect.com/products/wfm/performanceopt.cfm?section=performanceopt, 1page.
"Product Features," Guide to Call Center Automation, Brock Control Systems, Inc., Activity Managers Series™, Section 5—Company B120, Jun. 1992, p. 59.
"Product Features," Guide to Call Center Automation, CRC Information Systems, Inc., Tel-Athena, Section 5—Company C520, Jun. 1992, p. 95.
"Services for Computer Supported Telecommunications Applications (CSTA) Phase III," Standard ECMA-269, 5th Edition, Dec. 2002, ECMA International Standardizing Information and Communication Systems, pp. 1-666 (Parts 1-8).
"VAST™, Voicelink Application Software for Teleservicing®," System Manager User's Guide, Digital Systems, 1994, pp. ii, vii-ix, 1-2, 2-41 through 2-77.
"When Talk Isn't Cheap," Sm@rt Reseller, Apr. 3, 2000, vol. 3(13), p. 50.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Akitsu, "An Introduction of Run Time Library for C Program, the fourth round," C Magazine, Jul. 1, 1990, vol. 2(7), pp. 78-83.
Arslan et al., "Language Accent Classification in American English," Robust Speech Processing Laboratory, Duke University Department of Electrical Engineering, Durham, NC, Technical Report RSPL-96-7, revised Jan. 29, 1996, pp. 1-16.
Arslan, "Foreign Accent Classification in American English," Thesis submitted to Department of Electrical and Computer Engineering, Duke University, 1996, pp. 1-200.
Atkins et al, "Common Presence and Instant Messaging: Message Format," Network Working Group, Jan. 9, 2003, available at http://www.ietf.org/internet-drafts/draft-ietf-impp-cpim-msgfmt-08.txt, 31 pages.
"Basic Call Management System Reporting Desktop—Product Description," Avaya Inc., http://www.avaya.com/gcm/master-usa/en-us/products/offers/bcmrs_desktop.htm, printed May 19, 2005, copyright 2005, 2 pages.
"Basic Call Management System Reporting Desktop—Product Features," Avaya Inc., http://www.avaya.com/gcm/master-usa/en-us/products/offers/bcmrs_desktop.htm, printed May 19, 2005, copyright 2005, 2 pages.
"Basic Call Management System Reporting Desktop—Product Overview," Avaya Inc., http://www.avaya.com/gcm/master-usa/en-s/products/offers/bcmrs_desktop.htm, printed May 19, 2005, copyright 2005, 2 pages.
"Basic Call Management System Reporting Desktop—Product Technical," Avaya Inc., http://www.avaya.com/gcm/master-usa/en-us/products/offers/bcmrs_desktop.htm, printed May 19, 2005, copyright 2005, 2 pages.
"Call Management System—Product Description," Avaya Inc., http://www.avaya.com/gcm/master-usa/en-us/products/offers/call_management_system.htm, printed May 19, 2005, copyright 2005, 2 pages.
Call Management System—Product Features, Avaya Inc., http://www.avaya.com/gcm/master-usa/en-us/products/offers/call¯management¯system.htm, printed May 19, 2005, copyright 2005, 3 pages.
"Call Management System—Product Overview," Avaya Inc., http://www.avaya.com/gcm/master-usa/en-us/products/offers/call¯management¯system.htm, May 19, 2005, copyright 2005, 2 pages.
"Call Management System—Product Technical," Avaya Inc., http://www.avaya.com/gcm/master-usa/en-us/products/offers/call¯management¯system.htm, printed May 19, 2005, copyright 2005, 2 pages.
"Avaya Multi Channel Product Authorization (PA)," Avaya Inc., Version 5.0, Nov. 2003, 6 pages.
"Avaya IQ: Introducing Reporting and Analytics As You Designed It," Avaya Inc., Feb. 2007, 4 pages.
"Business Advocate Options," Avaya, Inc., http://www.avaya.com, printed Feb. 15, 2003, 4 pages.
"Business Advocate Product Summary," Avaya, Inc., http://www.avaya.com, printed Feb. 15, 2003, 3 pages.
"CentreVu Advocate, Release 9, User Guide," Avaya, Inc., Dec. 2000, Issue 1, 293 pages.
"Better Implementation of IP in Large Networks," Avaya Inc., Apr. 2002, 14 pages.

(56) References Cited

OTHER PUBLICATIONS

"The Advantages of Load Balancing in the Multi-Call Center Enterprise," Avaya Inc. White Paper, Feb. 2002, 14 pages.
"Voice Over IP Via Virtual Private Networks: An Overview," Avaya Inc. White Paper, Feb. 2001, 9 pages.
"Frequently Asked Questions—Domain Name Service FAQs," Bellsouth Corp., available at https://registration.bellsouth.net/NASApp/DNSWebUI/FAQ.jsp, printed Mar. 31, 2003, copyright 2002, 4 pages.
Bentley, "Metadata: Everyone Talks About It, But What Is It?" Proceedings of the Twenty-Sixth Annual Sas Users Group International Conference: Sas Institute Inc., 2001, Paper 125-26, 5 pages.
Berners-Lee et al., "RFC 2396: Uniform Resource Identifiers (URI); Generic Syntax," Network Working Group, Aug. 1998, 38 pages.
Bischoff et al., "Data Ware House Building Method—practical advices telled by persons having experience and experts," Kyouritsu Shuppan Corp., May 30, 2000, First Edition, pp. 197-216.
Boussaid et al., "Integration and dimensional modeling approaches for complex data warehousing," J. Global Optimization, vol. 37, No. 4, Apr. 2007, 2 pages.
Cabibbo et al., "An Architecture for Data Warehousing Supporting Data Independence and Interoperability," International Journal of Cooperative Information Systems, Nov. 2004, 41 pages.
Cahoon, "Fast Development of a Data Warehouse Using MOF, CWM and Code Generation," CubeModel, May 22, 2006, 32 pages.
Chavez et al., "Avaya MultiVantage Software: Adapting Proven Call Processing for the Transition to Converged IP Networks," Avaya, Inc., Aug. 2002, 20 pages.
Cherry, "Anger Management," IEEE Spectrum, Apr. 2005, p. 16.
Coles, Scott, "A Guide for Ensuring Service Quality in IP Voice Networks," Avaya, Inc., 2002, pp. 1-17.
Creating and Using Data Warehouse Dimension Tables (Microsoft) copyright 2005, http://msdn.microsoft.com/library/en-us/createdw/createdw—10kz.asp?frame=true, 3 pages.
Creating and Using Data Warehouse-Using Dimensional Modeling (Microsoft) downloaded May 18, 2005 http://msdn.microsoft.com/library/en-us/createdw/createdw—39z.asp?frame=true 1 page.
Crocker et al., "Common Presence and Instant Messaging (CPIM)," Network Working Group, Aug. 14, 2002, available at http://www.ietf.org/internet-drafts/draft-ietf-impp-cpim-03.txt, 33 pages.
Cunningham, Lewis R., "My Personal Dictionary," An Expert's Guide to Oracle Technology, posted Mar. 31, 2005, http://blogs.ittoolbox.com/oracle/guide/archives003684.asp, 4 pages.
Smith, "Data Model Overview: Modeling for the Enterprise While Serving the Individual," Teredata Global Sales Support, 2007, 33 pages.
Kimball, "Surrogate Keys: Keep Control Over Record Identifiers by Generating New Keys for the Data Warehouse," DBMS Online, Data Warehouse Architect, May 1998, 4 pages.
Kimball, "Design Constraints and Unavoidable Realities: No design Problem in school was this hard," Intelligent Enterprise Magazine, Data Warehouse Designer, Sep. 3, 2002, 3 pages.
Kimball, "An Engineer' s View: Its Worthwhile to Remind Ourselves Why We Build Data Warehouses the Way We Do," Intelligent Enterprise Magazine, Data Warehouse Designer, Jul. 26, 2002, 3 pages.
Kimball, "Divide and Conquer: Build Your Data Warehouse One Piece at a Time," Intelligent Enterprise Magazine, Data Warehouse Designer, Oct. 30, 2002, 3 pages.
Kimball, "TCO Starts with the End User: The conventional view of data warehouse total cost of ownership myopic and wrong," Intelligent Enterprise Magazine, Data Warehouse Designer, May 13, 2003, http://www.intelligententerprise.com/030513/608warehouse1—1.jhtml?—requestid=598425, 3 pages.
Kimball, "The Soul of the Data Warehouse, Part One: Drilling Down," Intelligent Enterprise Magazine, Data Warehouse Designer, Mar. 20, 2003, 3 pages.
Kimball, "The Soul of the Data Warehouse, Part Three: Handling Time," Intelligent Enterprise Magazine, Data Warehouse Designer, Apr. 22, 2003, 3 pages.
Kimball, "The Soul of the Data Warehouse, Part Two: Drilling Across," Intelligent Enterprise Magazine, Data Warehouse Designer, Apr. 5, 2003, 3 pages.
Kimball, "Two Powerful Ideas, The Foundation for Modern Data Warehousing," Intelligent Enterprise Magazine, Data Warehouse Designer, Sep. 17, 2002, 3 pages.
Kimball, "Fact Tables and Dimension," Intelligent Enterprise Magazine, Data Warehouse Designer, Jan. 1, 2003, http://www.inteeigententerprise.com/030101/602warehouse1—1.jhtml, 3 pages.
Dawson et al., "RFC 2426: Vcard MIME Directory Profile," Network Working Group, Sep. 1998, available at http://www.ietf.org/rfc/rfc2426.txt?number=2426, 40 pages.
Dawson, "NPRI's Powerguide, Software Overview," Call Center Magazine, Jun. 1993, p. 85.
Day et al., "RFV 2778: A Model for Presence and Instant Messaging," Network Working Group, Feb. 2000, available at http://www.ietf.org/rfc/rfc2778.txt?number=2778, 16 pages.
Day et al., "RFC 2779: Instant Messaging/Presence Protocol Requirements," Network Working Group, Feb. 2000, available at http://www.ietf.org/rfc/rfc2779.txt?number=2779, 25 pages.
Definity Communications System Generic 3 Call Vectoring/Expert Agent Selection (EAS) Guide, AT&T Publication No. 555-230-520, Sep. 1995, Issue 4, 458 pages.
Dillon, "Renaming fields and tracing dependencies," available at http://allenbrowne.com/ser-41.html, Nov. 2003, updated May 2006, 1 page.
Durr, "Still Leaving It to Fate?: Optimizing Workforce Management," Customer Interaction Solutions, Nov. 2001, 5 pages.
Emura, "Windows API Utilization Guide, Points for Knowledges and Technologies," C Magazine, Oct. 1, 2005, vol. 17(10), pp. 147-150.
Fielding et al., "RFC 2068: Hypertext Transfer Protocol—HTTP/1.1," Network Working Group, Jan. 1997, 152 pages.
Foster et al., "Avaya Business Advocate and its Relationship to Multi-Site Load Balancing Applications," Avaya, Inc., Mar. 2002, 14 pages.
"Fundamentals of Data Warehousing—Unit 3—Dimensional Modeling, Fundamentals of Data Warehousing," Evolve Computer Solutions, copyright 2005, 55 pages.
Geotel Communications Corporation Web site printout entitled "Intelligent CallRouter™," 1998, 6 pages.
Curlingstone Publishing Glossary, http://www.curlingstone.com/7002/7002glossary.html, printed May 24, 2005, 11 pages.
Gulbrandsen et al., "A DNS RR for Specifying the Location of Services (DNS SRV)," Network Working Group, Feb. 2000, available at http://www.ietf.org/rfc/rfc2782.txt?number=2782, 12 pages.
Hansen et al., "Foreign Accent Classification Using Source Generator Based Prosodic Features," IEEE Proc. ICASSP, May 1995, Detroit, MI, vol. 1, pp. 836-839.
Hellstrom et al., "RFC 2793: RTP Payload for Text Consersation," Network Working Group, May 2000, available at http://www.faqs.org/rfcs/rfc2793.html, 8 pages.
Holtman et al., "RFC 2296: HTTP Remote Variant Selection Algorithm—RVSA/1.0," Network Working Group, Mar. 1998, available at http://www.ietf.org/rfc/rfc2296.txt?number=2296, 13 pages.
Hotlman et al., "RFC 2295: Transparent Content Negotiation in HTTP," Network Working Group, Mar. 1998, available at http://www.ietf.org/rfc/rfc2295.txt?number=2295, 55 pages.
Karakasidis, A., "Queues for Active Data Warehousing," in Proceedings on Information Quality in Informational Systems (IQIS'2005), Jun. 17, 2005, Baltimore, MA, pp. 28-39, ISBN: 1-59593-160-0.
Kim et al., "Collaborative Multimedia Middleware Architecture and Advanced Internet Call Center," Proceedings at the International Conference on Information Networking, Jan. 31, 2001, pp. 246-250.
Kimball et al., The Data Warehouse ETL Toolkit: Practical Techniques for Extracting, Cleaning, Conforming, and Delivering Data, John Wiley & Sons, 2004, pp. 170-174.
Kimball et al., The Data Warehouse Toolkit: The Complete Guide to Dimensional Modeling, 2nd Edition, John Wiley & Sons, 2002, pp. 240-241, 260-262, 292-293.
Klyne, "RFC 2533: A Syntax for Describing Media Feature Sets," Network Working Group, Mar. 1999, available at http://www.ietf.org/rfc/rfc2533.txt?number=2533, 35 pages.

(56) References Cited

OTHER PUBLICATIONS

Klyne, "RFC 2703: Protocol-independent Content Negotiation Framework," Network Working Group, Sep. 1999, available at http://www.ietf.org/rfc/rfc2703.txt?number=2703, 19 pages.
Koutarou, "Building a Framework for EC using Hibernate, OSWorkflow," Java Press, Japan, Gujutsu Hyouron Company, vol. 25, 2004, pp. 132-147.
Lamel et al., "Language Identification Using Phone-Based Acoustic Likelihood," IEEE International Conference on Acoustics, Speech, and Signal Processing, 1994, vol. 1, pp. 293-296.
Microsoft R Access 97 for Windows R Application development guide, Ver. 8.0, Microsoft Corp., a first version, pp. 569-599.
MIT Project Oxygen, Pervasive, Human-Centered Computing, MIT Laboratory for Computer Science, Jun. 2000, pp. 1-15.
Moss et al., "The Importance of Data Modeling as a Foundation for Business Insight," 2004, 38 pages.
"NICE Analyzer™: Overwhelmed by the Amount of Data at your Contact Center?" NICE Systems, Insight from Interactions, http://www.nice.com/products/multimedia/analyzer.php, printed May 19, 2005, 2 pages.
"Contact Center and Enterprise Products," NICE Systems, Insight from Interactions, http://www.nice.com/products/multimedia/contact_centers.php, printed May 19, 2005, 3 pages.
Noth et al., "Research Issues for the Next Generation Spoken," University of Erlangen-Nuremberg, Bavarian Research Centre for Knowledge-Based Systems, at http://www5.informatik.uni-erlangen.de/literature/psdir/1999/Noeth99:RIF.ps. gz, 1999, 8 pages.
Presentation by Victor Zue, The MIT Oxygen Project, MIT Laboratory for Computer Science, Apr. 25-26, 2000, 9 pages.
Reeves, Laura, "Business Dimensional Modeling: The Logical Next Step: Translating the BDM," DM Review Magazine, May 2004, 4 pages.
Rose et al., "The APEX Presence Service," Network Working Group, Jan. 14, 2002, available at http://www.ietf.org/internet-drafts/draft-ietf-apex-presence-06.txt, 31 pages.
Sarda, "Temporal Issues in Data Warehouse Systems," Database Applications in Non-Traditional Environments (DANTE'99), 1999, S. 27, DOI: 10.1109/DANTE.1999.844938.
Schulzrinne et al., "RFC 2833: RTP Payload for DTMF Digits, Telephony Tones and Telephony Signals," Network Working Group, May 2000, available at http://www.faqs.org/rfcs/rfc2833.html, 23 pages.
Schwarzkopf, A.B., "Dimensional Modeling for a Data Warehouse," date unknown, 18 pages.
Seo, "akuto/FC shop sale assistant systme etc., compressing into halves the Number of days for stock possession by a multi-bender EPR plus POS," Network Computing, Japan Licktelecom Corp., Apr. 1, 2000, vol. 12(4), pp. 45-49.
Shockey, "ENUM: Phone Numbers Meet the Net," www.cConvergence.com, Jul. 2001, pp. 21-30.
Snape, "Time Dimension and Time Zones," at http://www.jamessnape.me.uk/blog/CommentView,gui,79e910a1-0150-4452-bda3-e98d, Aug. 7, 2004, 10 pages.
Songini, "ETL QuickStudy," ComputerWorld, accessed at http://www.computerworld.com/databasetopics/businessintelligence/datawarehouse/story/ . . . , Feb. 2, 2004, 5 pages.
Stevenson et al., "Name Resolution in Network and Systems Management Environments," http://netman.cit.buffalo.edu/Doc/DStevenson/NR-NMSE.html, printed Mar. 31, 2003, 16 pages.
Sugano et al., "Common Presence and Instant Messaging (CPIM) Presence Information Data Format," Network Working Group, Dec. 2002, available at http://www.ietf.org/internet-drafts/draft-ietf-impp-cpim-pidf-07.txt, 26 pages.
Vaisman et al., "A Temporal Query Language for OLAP: Implementation and a Case Study," LNCS, 2001, vol. 2397, 36 pages.
Veerman, E., "Designing a Dimensional Model," http://atlantamdf.com/Presentations/AtlantaMDF_091106.pdf, printed Aug. 30, 2007, 38 pages.
Watkins, Thayer, "Cost Benefit Analysis," San Jose State University Economics Department, 1999, Web Archive http://web.arch ive.org/web/19990225143131/http://www.sjsu.edu/faculty/watkins/cba.htm, 13 pages.
Wiederhold, "Mediation to Deal with Heterogeneous Data Sources," Stanford University, Jan. 1999, 19 pages.
Zmolek, "Simple and Presence: Enterprise Value Propositions," Avaya presentation, presented Jan. 24, 2002, 16 pages.
Extended European Search Report for European Patent Application No. 10178909.7, dated Feb. 15, 2011.
Official Action for U.S. Appl. No. 12/620,428, mailed Feb. 15, 2013 17 pages.
Product Description of "Avaya one-X Agent" printed on Sep. 15, 2009 from http://www.avaya.com/usa/product/avaya-one-xagent; 1 pg.
Product Brief of "Avaya IP Agent" printed on Sep. 15, 2009 from http://docs.google.com/gview?a=v&q=cache:IRR32Pfzp98J:www.nacr.com/uploadedFiles/Products/Avaya%2520IP%2520Age . . . ; 1 pg.
Product Overview of "IP Softphone" printed on Sep. 15, 2009 from http://www.nacr.com/Products.aspx?id=236; 3 pgs.
Google Docs "IP Softphone for Windows Mobile 5" printed on Sep. 15, 2009 from http://docs.google.com/gview?a=v&q=cache:92VrteFXqm8J:support.avaya.com/css/P8/documents/100021136+Avaya+telecom . . . ; 1 pg.
Blog from "Road warrior and telecommuter-Community for Avaya Users" printed on Sep. 15, 2009 from http://www.avayausers.com/showthread.php?p=13430; 4 pgs.
Avaya one-X Agent Release 1.0 Release Notes; 6 pgs, Sep. 2009.
Overview of Avaya IP Softphone printed on Sep. 15, 2009 from http://support.avaya.com/elmodocs2/ip_softphone/Overview_IP_Softphone_R6.htm; 2 pgs.
Official Action for U.S. Appl. No. 12/620,428, mailed May 31, 2013 20 pages.

* cited by examiner

AUTOMATIC CONFIGURATION OF SOFT PHONES THAT ARE USABLE IN CONJUNCTION WITH SPECIAL-PURPOSE ENDPOINTS

FIELD

The disclosure relates generally to telecommunication devices and particularly to software-controlled telecommunication devices.

BACKGROUND

People who are hearing-impaired, or unable to speak, communicate via the telephone network by using specialized text terminals, commonly referred to as a Telecommunication Device for the Deaf ("TDD") or a teletypewriter ("TTY"). A TTY converts symbols (letters, numbers, punctuation, etc.) typed on its keyboard into audio signals that it transmits through the telephone network to another TTY. The receiving TTY converts the audio signals back into symbols and displays them on its display screen. A call between TTYs is established and terminated in the same manner as between telephones: either the TTY emulates the call signaling of a telephone, or the TTY user uses a standard telephone to initiate, dial, answer, and terminate the call, and uses the TTY only for the traffic-exchange portion of the call. The TTY usually connects to the same analog RJ-11 line as the telephone via an RJ-11 splitter.

In Voice over Internet Protocol ("VoIP") networks, softphone applications, such as Avaya IP Softphone™, IP Agent™, and One-X Agent™ manufactured by Avaya, Inc., allow an associated desktop computer to serve as the physical telephony endpoint for voice conversations. By the softphone application, the user can perform normal telephony functions directly through the computer.

These softphone applications have multiple, discrete modes. In a road warrior mode, the user's headset or handset is plugged into the computer's USB port or sound card, and the user engages in VoIP calls using the sound card of the computer. In other words, the computer serves as the physical telephony endpoint for the voice conversation. In a telecommuter or dual connect mode, the user receives toll quality audio via a standard telephone having a separate Public Switch Telephone Network ("PSTN") connection to the server. In this mode, the associated telephone is controlled by the softphone application. Examples of functions under the control of the softphone application, include dialing, hold, conference, and the like. When the user goes "off hook" with the softphone application, the associated telephone number provided to the softphone application by the user is called, and the user's conversation places on the associated telephone. When answered, the call is supported by the associated telephone and not by the computer's sound card. During the conversation, the user retains control of the softphone application. Another discrete mode includes the shared control mode (in which the associated telephone is controlled by both the associated softphone application and server whereby the user can dial from his or her IP network connected Personal Digital Assistant ("PDA") through the user's desk phone).

Softphone applications are voice-only and do not have embedded support for non-voice telephony applications, such as TTY, or for special telephony applications, such as video. Embedded support, though possible, can become expensive very quickly because of the large number of different formats and media that would need to be supported. Illustratively, with the European Union alone there are six different incompatible TTY protocols (e.g., European V.18, V.21, EDT, Mintel, and 50 baud Baudot), some of which require the endpoints to respond appropriately to a handshake tone and then maintain a constant carrier tone. A further complication is that the EU protocols are not compatible with the TTY protocols used most commonly in the United States (e.g., 45.45 baud Baudot and TurboCode)

Although it is possible for softphone applications to control the behavior of auxiliary special-purpose (adjunct) telecommunication devices (thereby providing a solution when the embedded voice-only interface is inadequate), the user must switch manually back-and-forth between the various modes to configure the softphone application for one mode or the other before the arrival of a specific type of telephone call. Illustratively, a contact center agent who is configured for "road warrior" mode cannot interact with an unexpected TTY-using customer or multimedia (video) call; similarly, a TTY-equipped agent who is configured for "telecommuter" operation is unable to accommodate voice callers.

A common approach in contact centers is to use server-based functions to identify calls that cannot be accommodated by voice-only soft clients. For example, methods that allow inbound calls to be identified as needing 45.45 baud Baudot TTY support include (a) the caller dialed-in using the contact center's TTY phone number; (b) the caller selected "Standard TTY" in an auto attendant menu; and (c) the gateway detected that the caller was transmitting 45.45 baud Baudot TTY signals. Once detected, these calls are routed to appropriate special-purpose endpoints. Although the server can identify the special requirements of these calls and route them to appropriate devices, the agents who answer the calls do not have access to many of the auxiliary functions provided by contact center agent-facing software.

In another approach, the contact center runs the softphone in telecommuter mode, with a TTY designated as the associated physical device. This poses a problem. A softphone can be in road warrior mode or telecommuter mode, with no automatic ability to switch from one mode to the other based on the media requirements of the call. Moreover, a softphone in telecommuter mode can have only one associated desktop device, with no automatic ability to choose among a variety of desktop devices depending on the media requirements of the call.

SUMMARY

These and other needs are addressed by the various embodiments and configurations of the present disclosure. The present invention is directed to a process and machine for switching between differing modes of a telephony module, such as a softphone application.

In one embodiment, a process is provided that includes the steps:

(a) providing a telephony module having discrete first and second modes for a given contact, the second mode enabling voice-only communications and the first mode enabling a communication media other than voice;

(b) determining, by a computer-executable contact type identification module, a corresponding media type for a first incoming contact;

(c) selecting, by a computer-executable mode controller and based on the determined corresponding media type, one of the first and second modes; and (d) causing, by the computer-executable mode controller, the telephony module to switch to the selected one of the first and second modes.

In another embodiment, a process is provided that includes the steps:

(a) providing a number of communication devices, each device having a corresponding electronic address and a different set of media requirements;

(b) determining, by a computer-executable contact type identification module, a corresponding media type for a first incoming contact;

(c) determining, by a computer-executable controller and based on the determined corresponding media type, an electronic address of one of the plurality of communication devices compatible with the determined corresponding media type; and (d) causing, by the computer-executable controller, the incoming call to be directed to the determined electronic address.

The present disclosure can provide a number of advantages depending on the particular configuration. For example, the above embodiments can allow automatic per-call reconfiguration of soft clients based on the media type or types of the call, such that the client is configured automatically to operate in stand-alone mode when the client supports the media requirements of the call or configured automatically to operate in conjunction with the appropriate specialized auxiliary telecommunication (endpoint) device when the client does not provide native support for the desired media. The embodiments can enable switching between embedded and non-embedded modes. The embodiments can facilitate compliance with governmental regulations, such as Section 508 of the Rehabilitation Act Amendments of 1998 (36 CFR Part 1194) procurement regulations. These regulations require contact center agents to be capable of servicing voice and TTY calls. The embodiments can further eliminate dual party relay services for conversations that include sensitive information. This can be particularly important for contact center agents in the financial and healthcare sectors.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

Figure 1:
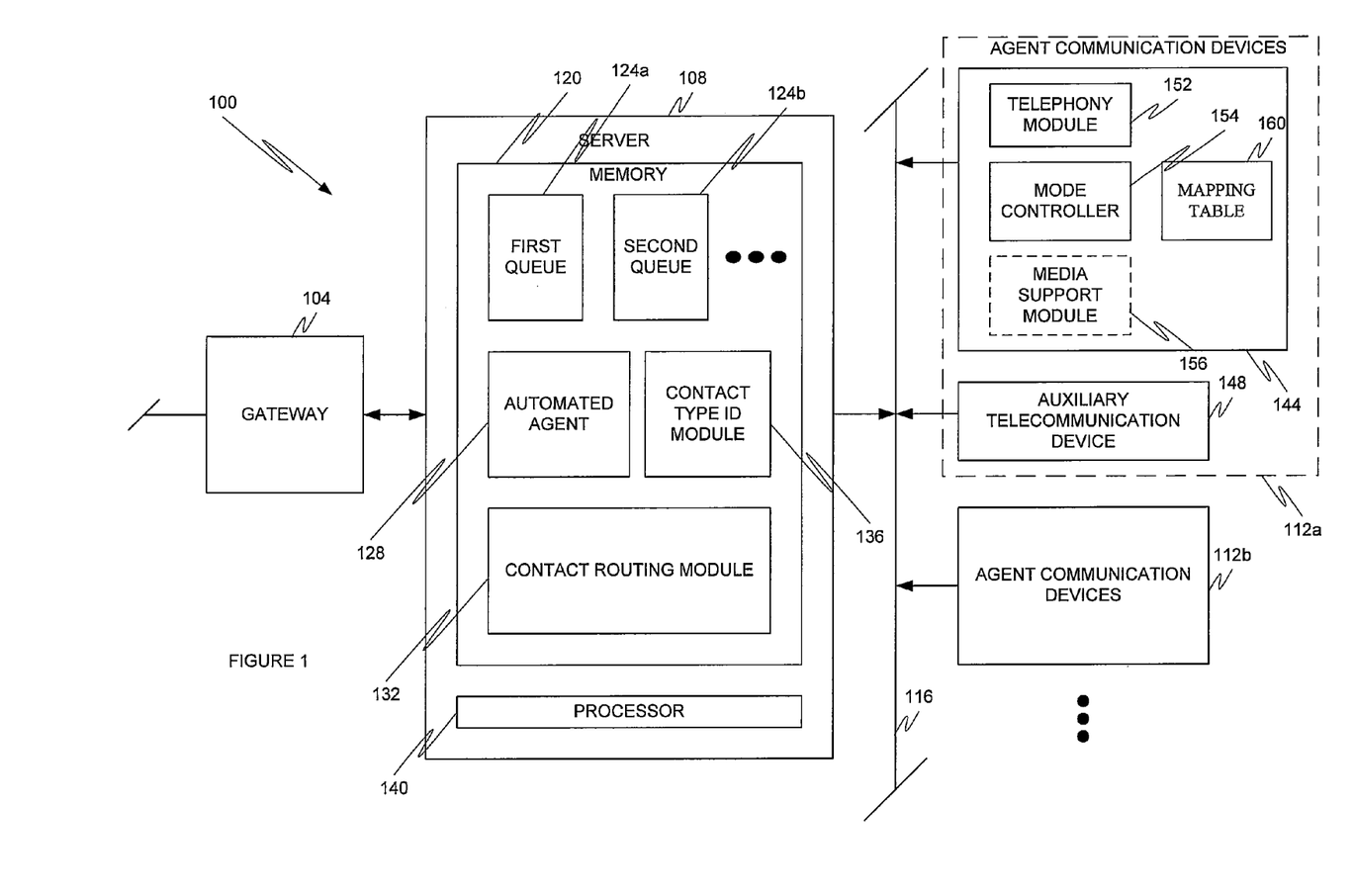
FIG. 1 is a block diagram depicting a contact center according to a first embodiment.

Referring to FIG. 1, a first embodiment of a contact center 100 is depicted.

The contact center 100 includes a gateway 104, contact center server 108, and a plurality of agent communication devices 112*a*, *b*, . . . , all interconnected by a Local Area Network ("LAN") 116. The gateway is an electronic repeater device that intercepts and steers electrical signals from a Wide Area Network ("WAN") (not shown) to the LAN 116.

The contact center server 108 is a software-controlled computer processing device that receives, processes, and routes inbound and outbound contacts to and from (human) contact center agents (not shown). Included in the memory 120 are first, second, . . . queues 124a, b, . . . for holding customer contacts or other work items for assignment to and servicing by a contact center agent, an automated agent 128, such as Interactive Voice Response ("IVR") module, to interact with customers, a contact routing module 132 (such as Communication Manager™ by Avaya, Inc.) for processing and routing inbound and outbound contacts, and a contact type ID module 136 to characterize types of incoming contacts, all executed by a processor 140.

Each contact center agent has a corresponding agent communication device 112a, b, . . . . Each agent communication device 112 includes a computer station 144 and one or more auxiliary (special-purpose) auxiliary telecommunication devices 148. The computer station 144, which can be, for example, a Personal Computer ("PC") or laptop, includes in memory a telephony module 152, such as a softphone application, to provide telecommunication functions, a mode controller 154 to select an operating mode for the telephony module 152, an (embedded or non-embedded) media support module 156 to provide support for a selected media type having specific format and media requirements (such as a selected TTY protocol, a multimedia (e.g., voice and video) telephony application, facsimile, and other non-VoIP voice or non-voice telephony applications), and a mapping table 160 to map media type identifiers against an associated media support module and/or auxiliary telecommunication device 148. The auxiliary telecommunication device 148 can be any suitable special-purpose device, including, for example, an analog or digital TTY corresponding to a specific TTY protocol, a facsimile machine, a captioned TTY (such as a Captel™ TTY manufactured by Ultratec Corporation), a PSTN- or VoIP-capable video telephone (such as the video telephones manufactured by Sorenson Communications), and facsimile. In one configuration, a plurality of special-purpose embedded applications or external endpoints, each having a different telephone number, are simultaneously under the control of the telephony module 152. Illustratively, a plurality of TTY's, each having a different telephone number and corresponding to a different TTY protocol, are controlled simultaneously by the telephony module 152.

The methodologies for call placement and receipt of calls depend on the particular mode of the telephony module 152. Regarding outbound calls when an agent in telecommuter or first mode initiates a call from the telephony module 152 (i.e., "dials" a phone number via a softphone Graphical User Interface ("GUI")), the server 108 actually places two phone calls. The first call is to the agent's auxiliary telecommunication device (e.g., desktop device such as a telephone or TTY) at the "reach number" that the agent designated in his or her telecommuter preferences. After the agent answers his or her auxiliary telecommunication device, the server 108 then places a second phone call to the number that the agent had dialed with the telephony module 152. A communication path is established between the agent's auxiliary telecommunication device and the called party's telecommunication device (e.g., a telephone or TTY). In this scenario, even though the telephony module is not part of the communication pathway, the telephony module controls the behavior of the agent's auxiliary telecommunication device. The "Caller ID" information received by the called party is that of the telephony module, not the Caller ID number of the auxiliary telecommunication device. For example, if one were to use a softphone from home in telecommuter mode, and call a person at the office, the caller would be speaking from his or her home phone but the Caller ID viewed by the callee would be the caller's office number. Regarding inbound calls if an agent were to use the telephony module from home in telecommuter mode and a call is received to his or her office number, the agent's home phone will ring. Note that, when the agent is logged in with telephony module in this manner, the agent's home phone will ring but his or her office phone will not. The agent can answer his or her home phone and speak to the caller. When the caller and callee are connected in this manner, the agent can use his or her telephony module for a full range of telephony functions, identical to the functions the agent would be able to use if the agent were in his or her office and answered his or her office phone, e.g., transfer, drop, conference, etc.

The contact center 100 is able, by the contact type ID module 136, to determine a type of incoming call, provide notification, by the contact type ID module 136 to the mode controller 154, of a contact-type identifier corresponding to the type of incoming call, select automatically by the mode controller 154 an appropriate operating mode of the telephony module 152 to support the call, and cause the telephony module 152 to switch to the selected operating mode. In one configuration, the mode controller 154 maps the contact-type identifier to the mapping table 160 to select an electronic address of an appropriate media support module 156 or auxiliary telecommunication device 148 to support the call and provides the selected electronic address to the contact routing module 132 to route the call to the selected electronic address.

Figure 2:
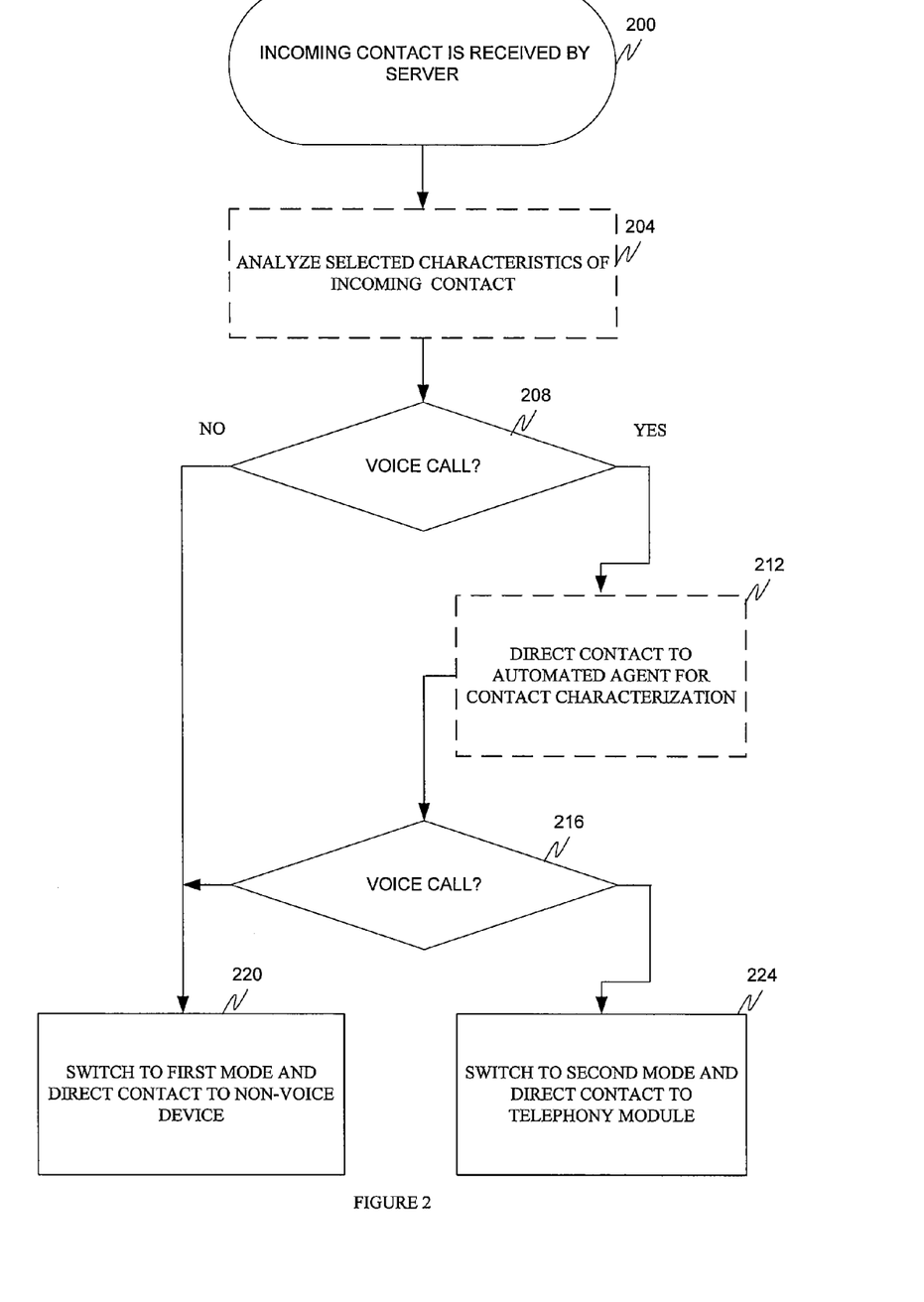
FIG. 2 is a flowchart depicting a process according to a second embodiment.

A first operational process will be discussed with reference to FIG. 2.

In oval 200, an incoming contact is received by the gateway 104 and finally the contact center server 108.

In optional step 204, the gateway 104 and/or contact type ID module 136, applying appropriate rules, analyzes selected characteristics of the incoming contact to determine a type of incoming contact. The analysis may be performed, for example, by any suitable technique. In one configuration, the gateway 104 analyzes one or more of the characteristics (e.g., frequency, duration, and amplitude) of the handshake and carrier tones (or the acoustic signature of the calling device), such as 300 baud ASCII, 1200 baud ASCII, and V.21 TTYs. In one configuration, the contact routing module 132 determines the contact type based on the number called. For example, the contact center 100 can have a dedicated number for TTY calls.

In decision diamond 208, the contact routing module 132 next determines whether or not the contact is a voice call. The rule commonly applied in decision diamonds 208 and 216 (discussed below) is that any call that is not conclusively identified as a media type requiring treatment by a module other than the telephony module 152 is a voice call.

When the call is identified as a voice call, the contact routing module 132, in step 212, directs the contact to the automated agent 128 for further processing. In one configuration, the automated agent 128 applies an auto attendant menu and queries the caller to determine whether special treatment is needed. In response to one of the queries, the caller can indicate that he or she is a TTY caller (e.g., the caller can select "Standard TTY"). In another configuration, a TTY announcement is made by the server 108 to the calling device inquiring whether the calling device is a TTY. This technique is further discussed in copending U.S. application Ser. No. 11/087,290, filed Mar. 22, 2005, which is incorporated herein by this reference.

Using the results of step 212, the contact routing module 132 again determines in decision diamond 216 whether or not the call is a voice call.

When the call remains identified as a VoIP call, the contact routing module 132, in step 224, instructs the mode controller 154 to cause the telephony module 152 to switch to a second mode (e.g., the road warrior mode) and directs the contact to the telephony module 152.

When the call is definitively determined to require special treatment, the contact routing module 132, in step 220, instructs the mode controller 154 to cause the telephony module 152 to switch to a first mode (e.g., the telecommuter mode) and directs the contact to the media support module 156 and/or auxiliary telecommunication device 148, as appropriate, corresponding to the electronic address received from the mode controller 154. In one configuration, multiple TTY devices are associated with a common agent communication device 112, each TTY device corresponding to a different TTY protocol. The contact type ID module 136 determines the specific protocol requirements of the incoming call and, based on the electronic address provided by the mode controller 154 (which determines the electronic address by mapping the media-type identifier received from the contact type ID module 136 against the mapping table 160), directs the incoming call to the determined electronic address.

As will be appreciated, the ordering of decision diamonds 208 and 216 can be reversed, depending on the contact center configuration.

A second operational process will be discussed with reference to FIG. 3. In this embodiment, a hybrid of the first and second modes is supported. Illustratively, people who are hard of hearing often prefer to receive text and then speak in response. This is ability is known as voice carryover and is a requirement in many countries for telecommunication devices. This style of interaction is supported by using simultaneously the second mode's channel (or second channel) for the voice communication and the first mode's channel (or first channel) for control of a TTY for the text communication. The TTY is bridged onto the voice call so that the hard-of-hearing customer talks to the agent via the sound card of the computer and the second channel while the agent responds via textual input on the TTY via the first channel. Although not preferred, it is possible to switch between modes sequentially when receipt of voice or text payload is detected by the mode controller 154.

Figure 3:
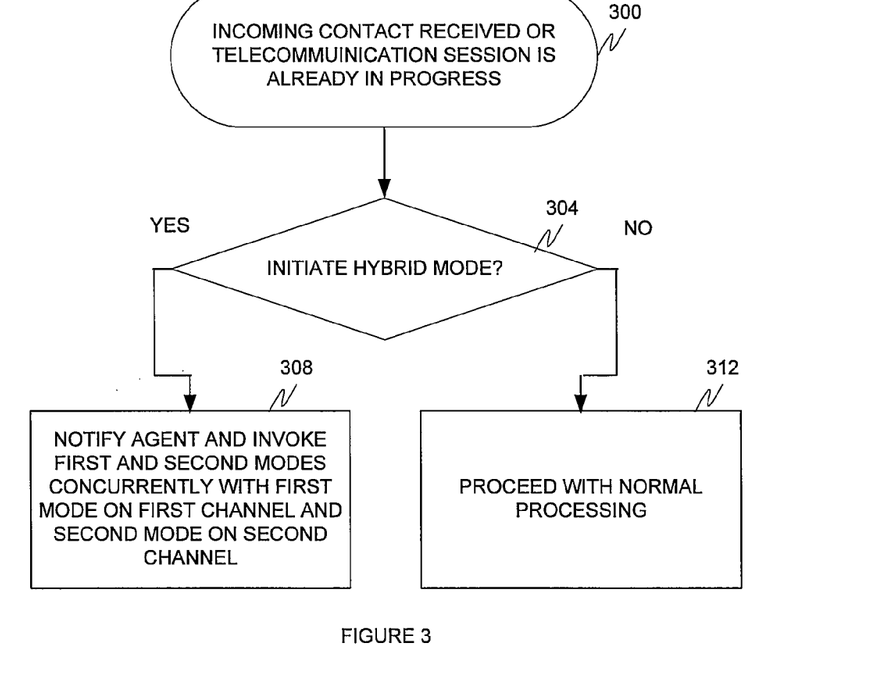
FIG. 3 is a flow chart depicting a process according to a third embodiment.

Referring to FIG. 3, in oval 300 an incoming contact is received or telecommunication session is already in progress.

In decision diamond 304, the mode controller 154 determines whether or not to initiate the hybrid mode. This determination can be made, as discussed above, based on contact center agent input, input received from the automated agent 128, and/or the called number.

When the hybrid mode is to be initiated, the mode controller 154, in step 308, notifies the contact center agent that a hybrid mode communication is to be or has been initiated, such as by a popup on the graphical user interface of the telephony module 152 executing on the computer station 144, by a distinctive ring to announce the incoming call, or by a distinctive tone, or set of tones, played by the computer station's sound card. In response, the agent begins communicating with the customer via both the first and second channels.

As will be appreciated, the call is set up by the mode controller 154 providing the electronic address of the pertinent auxiliary telecommunication device 148 to the contact routing module 132 along with an instruction to set up a bridged call. The contact routing module 132, in response, sets up the voice call on the second channel, the text call on the first channel and then bridges the two calls together. The agent knows to answer both incoming calls as a result of the notification.

When the hybrid mode is not to be initiated, the call, in step 312, is processed normally.

In one variation, when the incoming contact is to be set up as a hybrid mode call, the contact type ID module 136 can provide not only a contact type identifier but also a hybrid call identifier in the control signaling provided to the computer station 144. In one configuration, the absence of such a hybrid call identifier means that the call is not a hybrid call.

Figure 4:
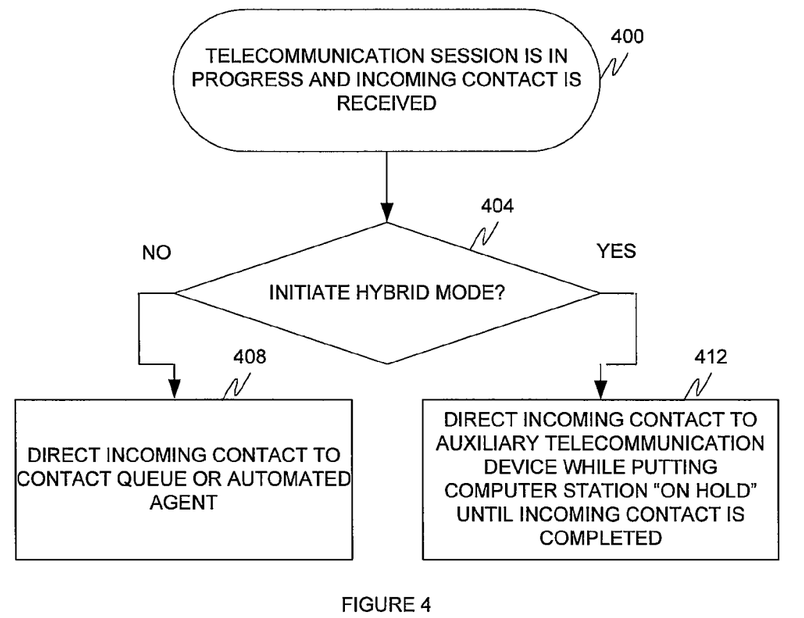
FIG. 4 is a flow chart depicting a process according to a fourth embodiment.

A third operational process will be discussed with reference to FIG. 4. As discussed below, this embodiment supports switching mid-call between the second (e.g., road warrior) and first (e.g., telecommuter) modes. As an example, a caller can speak with a contact center agent and then send a facsimile to that agent without initiating a new phone call.

In oval 400, a telecommunication session is in progress, and an incoming contact is received. In the example, the incoming contact is an incoming facsimile and is announced by CNG (or auto fax or calling) tones.

In decision diamond 404, the mode controller 154 determines whether or not to initiate a hybrid mode session. This determination is made by receiving a call directed to the electronic address of an auxiliary telecommunication device 148 of the contact center agent and/or receiving a notification from the telephony module 152 (as a result of agent input into the graphical user interface) that the contact center agent is to receive an incoming call to a specified auxiliary telecommunication device 148 associated with the current communication session.

When the hybrid mode is to be initiated, the contact routing module 132 directs the incoming contact to the auxiliary telecommunication device 148 while, from the view point of the contact center agent, putting the talk path of the computer station 144 "on hold" until the incoming contact is completed or until notification by the contact center agent that the bearer path is to be switched to the talk path. While the agent perceives that the voice call is "on hold", this description is not completely accurate. Both the currently connected and incoming contacts are simultaneously termed on the computer station 144 and auxiliary telecommunication device 148, respectively. They use a common channel for the bearer traffic; thus, while the bearer traffic for the incoming contact is received, there is no bearer channel for the original contact. Accordingly, the contact center agent hears silence while the bearer channel is used for the later, incoming contact.

When the hybrid mode is not to be initiated, the contact routing module 132 directs the incoming call to an appropriate first, second, . . . queue 124a, b, . . . or to an automated agent 128.

This embodiment might also be helpful when a called party answers an inbound call before reconfiguration to the appropriate node is completed. By way of example, the calling party has not gone through the menu of the automated agent 128 or has selected an incorrect menu option, and the agent erroneously answers the call using the second mode. In response to the customer input (such as the customer verbally asking for a specific auxiliary telecommunication device 148 or the contact center agent hearing the customer typing on a TTY or hears TTY tones), the contact center agent can initiate an inter-session mode switch.

Although the invention is discussed with reference to a contact center, it is to be appreciated that it may be used in any enterprise telecommunications network.

The exemplary systems and methods of this disclosure have been described in relation to a contact center. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a computer station, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the computer 144 simply provides a switching function among a number of different telecommunication devices based on the characterization of an incoming call (or nature of the calling device). For example, when the incoming call is a VoIP call it is switched to a telephony module 152 associated with the callee. When the incoming call is a PSTN call, it is switched to a PSTN telephone associated with the callee. When the incoming call is a TTY call, it is switched to a TTY associated with the callee. When the incoming call is a multimedia call, it is switched to a multimedia communication device associated with the callee. In each case, an indicator of the unique requirements of the incoming call, or contact type ID, is mapped against the mapping table 160 to determine the associated communication device or module to which the call is to be directed. In this embodiment, the mode of the telephony module 152 may or may not need to be changed. Indeed, the telephony module 152 may operate in only a single mode.

In another alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the embodiments, configurations, and aspects are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the disclosed embodiments, configurations, and aspects after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claims require more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process, comprising:
   providing a telephony module having discrete first and second modes for a given contact, the second mode enabling voice-only communications and the first mode enabling a communication media other than voice;
   determining, by a computer-executable contact type identification module, a corresponding media type for a first incoming contact, wherein determining the corresponding media type is based on at least one of:
     enquiring a calling device;
     measuring the first incoming contact for a characteristic of a handshake; and
     measuring the first incoming contact for a carrier tone of the calling device;
   selecting, by a computer-executable mode controller and based on the determined corresponding media type, one of the first and second modes;
   causing, by the computer-executable mode controller, the telephony module to switch to the selected one of the first and second modes;
   selecting, by the computer-executable mode controller and based on the determined corresponding media type, at least one of a media support module executing on a computer station of a contact center agent and an auxiliary telecommunication device associated with the contact center agent; and
   wherein the at least one of a media support module and the auxiliary telecommunication device comprises a plurality of telecommunication devices for the deaf, wherein each of the plurality of telecommunication devices for the deaf corresponds to a different teletypewriter protocol, and wherein each of the teletypewriter protocols corresponds to a different media type.

2. The process of claim 1, wherein the telephony module executes on the computer station of the contact center agent and further comprising:
   providing the at least one of the media support module executing on the computer station of the contact center agent and the auxiliary telecommunication device associated with at least one of the contact center agent and the computer station of the contact center agent; and
   requesting, by the computer-executable mode controller, the routing of the first incoming contact to the selected at least one of the media support module and the auxiliary telecommunication device.

3. The process of claim 1, wherein the determined corresponding media type is associated with one of the plurality of telecommunication devices for the deaf and the first mode is selected.

4. The process of claim 1, wherein the determined corresponding media type is associated with a voice-only call and the second mode is selected.

5. The process of claim 1, wherein the first incoming contact is a teletypewriter media type, wherein a second incoming contact is a voice media type, wherein the teletypewriter and voice media types are active simultaneously, wherein the teletypewriter and voice media types involve a common calling party and a common called party, wherein, with respect to the first contact, the telephony module has the first mode, wherein, with respect to the second contact, the telephony module has the second mode, and wherein the first and second contacts are bridged.

6. The process of claim 1, wherein the first incoming contact has a first media type, wherein a second incoming contact has a second media type, wherein the first and second media types are active simultaneously, wherein the first and second media types involve a common calling party and a common called party, wherein, with respect to the first contact, the telephony module has the first mode, wherein, with respect to the second contact, the telephony module has the second mode, and wherein the first and second contacts use a common bearer channel.

7. An article of manufacture comprising a computer readable medium comprising computer-executable instructions that, when executed, perform the steps of claim 1.

8. The process of claim 1, wherein the corresponding media type is determined by enquiring the calling device.

9. The process of claim 1, wherein the corresponding media type is determined by measuring the first incoming contact for the characteristic of the handshake.

10. The process of claim 1, wherein the corresponding media type is determined by measuring the first incoming contact for the carrier tone of the calling device.

11. A machine, comprising:
    a telephony module having discrete first and second modes for a given contact, the second mode enabling voice-only communications and the first mode enabling a communication media other than voice;
    a computer-executable contact type identification module operable to determine a corresponding media type for a first incoming contact, wherein determining the corresponding media type is based on at least one of:
  enquiring a calling device;
  measuring the first incoming contact for a characteristic of a handshake; and
  measuring the first incoming contact for a carrier tone of the calling device;
a computer-executable mode controller operable to select, based on the determined corresponding media type, one of the first and second modes and cause the telephony module to switch to the selected one of the first and second modes and select, based on the determined corresponding media type, at least one of a media support module executing on a computer station of a contact center agent and an auxiliary telecommunication device associated with the contact center agent; and
the at least one of the media support module executing on the computer station of the contact center agent and the auxiliary telecommunication device comprising a plurality of telecommunication devices for the deaf, wherein each of the plurality of telecommunication devices for the deaf corresponds to a different teletypewriter protocol, and wherein each of the teletypewriter protocols corresponds to a different media type.

12. The machine of claim 11, wherein the telephony module executes on the computer station of the contact center agent and further comprising:
the at least one of the media support module executing on the computer station of the contact center agent and the auxiliary telecommunication device associated with at least one of the contact center agent and computer station of the contact center agent; and wherein the computer-executable mode controller is operable to select, based on the determined corresponding media type, the at least one of the media support module and the auxiliary telecommunication device to receive the first incoming contact and request the routing of the first incoming contact to the selected at least one of the media support module and the auxiliary telecommunication device.

13. The machine of claim 11, wherein the determined corresponding media type is associated with one of the plurality of telecommunication devices for the deaf and the first mode is selected.

14. The machine of claim 11, wherein the determined corresponding media type is associated with a voice-only call and the second mode is selected.

15. The machine of claim 11, wherein the first incoming contact has is a teletypewriter media type, wherein a second incoming contact has a voice media type, wherein the teletypewriter and voice media types are active simultaneously, wherein the teletypewriter and voice media types involve a common calling party and a common called party, wherein, with respect to the first contact, the telephony module has the first mode, wherein, with respect to the second contact, the telephony module has the second mode, and wherein the first and second contacts are bridged.

16. The machine of claim 11, wherein the first incoming contact has a first media type, wherein a second incoming contact has a second media type, wherein the first and second media types are active simultaneously, wherein the first and second media types involve a common calling party and a common called party, wherein, with respect to the first contact, the telephony module has the first mode, wherein, with respect to the second contact, the telephony module has the second mode, and wherein the first and second contacts use a common bearer channel.

17. A process, comprising:
providing a plurality of communication devices, each of the plurality of communication devices having a corresponding electronic address and a different set of media requirements;
determining, by a computer-executable contact type identification module, a corresponding media type for a first incoming contact, wherein determining the corresponding media type is based on at least one of:
  enquiring a calling device;
  measuring the first incoming contact for a characteristic of a handshake; and
  measuring the first incoming contact for a carrier tone of the calling device;
determining, by a computer-executable controller and based on the determined corresponding media type, an electronic address of one of the plurality of communication devices compatible with the determined corresponding media type; and
causing, by the computer-executable controller, the incoming call to be directed to the determined electronic address, wherein the determined electronic address is for a communication device that comprises a plurality of telecommunication devices for the deaf, wherein each of the plurality of telecommunication devices for the deaf corresponds to a different teletypewriter protocol, and wherein each of the teletypewriter protocols corresponds to a different media type.

18. The process of claim 17, further comprising:
providing a telephony module having discrete first and second modes for a given contact, the second mode enabling voice-only communications and the first mode enabling a communication media other than voice;
selecting, by a computer-executable mode controller and based on the determined corresponding media type, one of the first and second modes; and
causing, by the computer-executable mode controller, the telephony module to switch to the selected one of the first and second modes.

* * * * *